United States Patent [19]

Kornrumpf et al.

[11] Patent Number: 4,541,288
[45] Date of Patent: Sep. 17, 1985

[54] OPERATING CIRCUIT FOR MAGNETOELASTIC FORCE/PRESSURE SENSORS

[75] Inventors: William P. Kornrumpf, Albany; Robert P. Alley, Clifton Park, both of N.Y.

[73] Assignee: General Electric Company, Schenectady, N.Y.

[21] Appl. No.: 546,228

[22] Filed: Oct. 27, 1983

[51] Int. Cl.[4] .............................................. G01L 1/12
[52] U.S. Cl. .................................. 73/862.69; 324/209
[58] Field of Search .............. 73/DIG. 2, 779, 862.36, 73/862.69; 324/209

[56] References Cited

U.S. PATENT DOCUMENTS

| 4,039,935 | 8/1977 | Wilson | 73/DIG. 2 |
| 4,322,973 | 4/1982 | Iwasaki | 324/209 X |
| 4,414,855 | 11/1983 | Iwasaki | 73/DIG. 2 |

OTHER PUBLICATIONS

"New Force Transducers Using Amorphous Ribbon Cores", Mohri et al., *IEEE Transactions on Magnetics*, vol. MAG-14, No. 5, Sep. 1978, pp. 1071–1075.
"Sensitive Force Transducers Using a Single Amorphous Core Multivibrator Bridge", Mohri et al., *IEEE Transactions on Magnetics*, vol. MAG-15, No. 6, Nov. 1979, pp. 1806–1808.
"Sensitive Magnetic Sensors Using Amorphous Weigand-Type Ribbons", Mohri et al., *IEEE Transactions on Magnetics*, vol. MAG-17, No. 6, Nov. 1981, pp. 3370–3372.
"Sensitive Bistable Magnetic Sensors Using Twisted Amorphous Magnetostrictive Ribbons Due to Matteucci Effect", Mohri et al., *Journal of Applied Physics*, vol. 53, No. 11, Nov. 1982, pp. 8386–8388.

*Primary Examiner*—Charles A. Ruehl
*Attorney, Agent, or Firm*—Geoffrey H. Krauss; James C. Davis, Jr.; Marvin Snyder

[57] ABSTRACT

An operating circuit for use with a magnetoelastic force/pressure sensor provides for changing the current flow through at least one sensor coil at a frequency responsive to the magnitude of a force impingent upon the sensor. The sensor operating circuit operates in a manner to prevent the sensor magnetoelastic core from being driven deeply into saturation, thus providing an operating circuit with a reduced current drain. A number of embodiments, including clock-driven and self-clocking (toggling) circuit providing digital and/or analog outputs are described.

33 Claims, 15 Drawing Figures

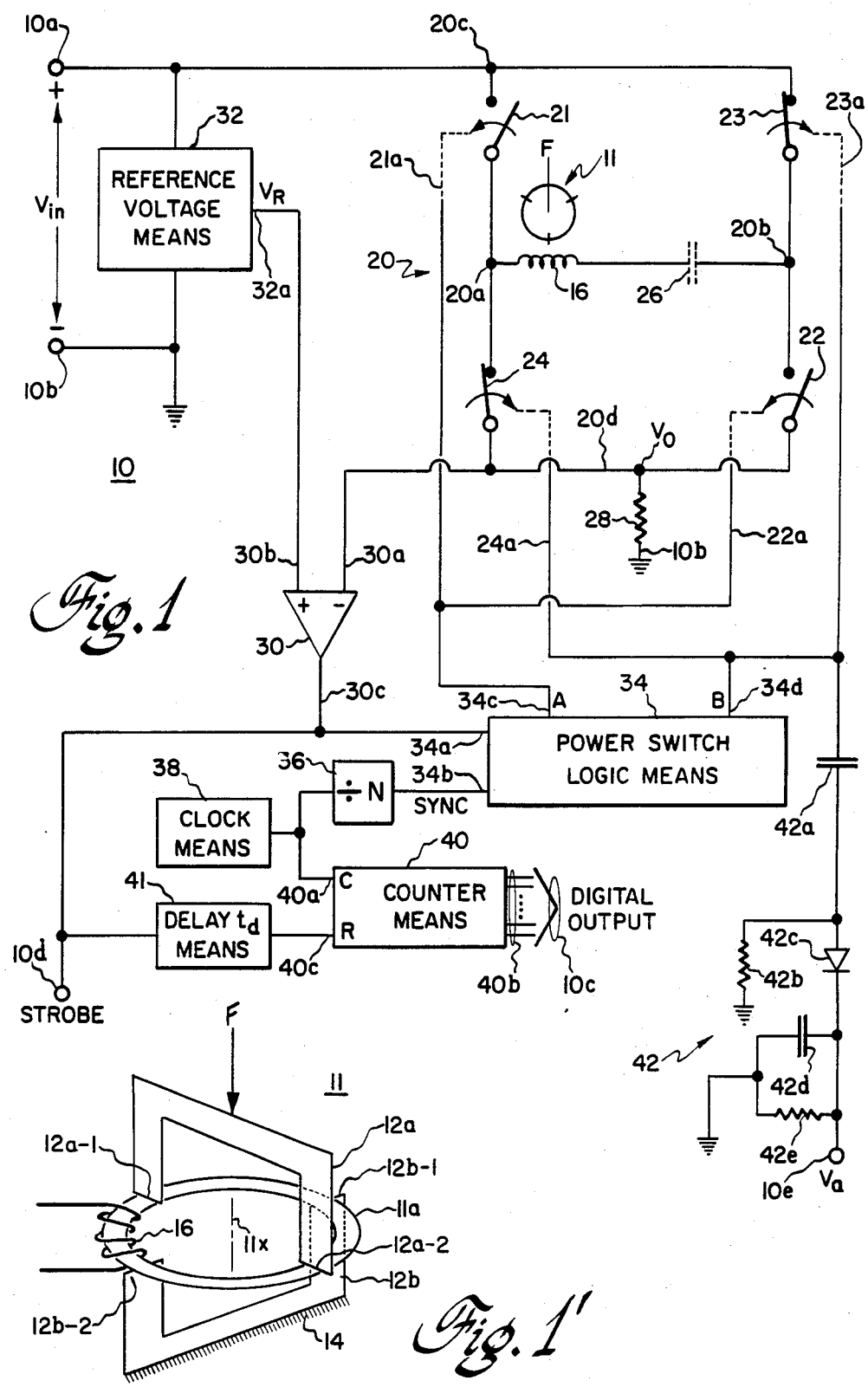

OPERATING CIRCUIT FOR MAGNETOELASTIC FORCE/PRESSURE SENSORS

BACKGROUND OF THE INVENTION

The present invention relates to transducer operating circuitry and, more particularly, to novel circuitry for obtaining output information from a force/presssure sensor of the magnetoelastic type.

Several forms of force/pressure transducers are known which utilize magnetoelastic materials. One sensor for measuring a force acting along the axis of a stack of magnetoelastic rings, and causing a variation in the magnetic flux density saturation magnitude of the ring stack hysteresis loop thereof responsive to the magnitude of the axial force, is described and claimed in co-pending application Ser. No. 546,227, filed on even date herewith, assigned to the assignee of the present application and incorporated herein by reference in its entirety.

Some magnetoelastic sensors are of the type having a single electrical coil which is excited by a periodically-changing voltage waveform of constant magnitude, provided from a low-impedance source, and from which a force-measuring output is obtained by monitoring the single coil current. Other magnetoelastic sensors have a pair of separate coils, with a constant current excitation being applied to the first coil and the sensor response being measured by the magnitude of an output voltage produced across the second coil. However, in energizing, or driving, the core of a magnetoelastic sensing device, the core (or the material of the stacked rings in the aforementioned application) is typically driven into the magnetic saturation region. The driving coil current required to energize the core into the saturation region may be as much as fifty times greater than the current required to drive the magnetically-unsaturated core. Thus, whether the driving excitation voltage is a waveform of sine or square waveshape, the exciting coil current will often reach large fractions of an ampere, especially since it is highly desirable to utilize an excitation coil having a relatively few number of turns, especially for a magnetoelastic sensor core having short magnetic length. Since it is undesirable, for economic reasons, to increase the number of exciting coil turns, it is highly desirable to provide circuitry which not only allows the peak current to be controlled to relatively low levels and still allows the use of an exciting coil of relatively few turns, but also one which provides the required output to determine the change in magnetic flux density saturation level, and thus the magnitude of the force acting upon the sensor, in as simple a manner as possible.

BRIEF SUMMARY OF THE INVENTION

In accordance with the invention, an operating circuit for a magnetoelastic force/pressure sensor regulates the drive current applied to at least one coil of the sensor such that the magnetizing force is increased only to the point of incipient material magnetic flux density saturation and changes the applied driving waveform frequency to keep the magnetoelastic material of the sensor stack at a maximum flux density substantially in the region about the saturation point, whereby the coil current is bounded and the magnetoelastic characteristic measurement is performed in the frequency domain; the resulting transducer (i.e. the combination sensor and operating circuit) appears to have increased stability and minimized current drain, on the operating potential source, in addition to enhanced reproducability and accuracy, when operating in this mode. The transducer is also novel in that a digital signal output is directly provided, without requiring at least one conversion to, or from, an analog signal.

In several presently preferred embodiments, utilizing full-bridge or half-bridge switching means, a bidirectional drive current flow through a single sensor coil is provided, with the current flow polarity being reversed when the coil current exceeds a predetermined value; the frequency of coil reversal is related to the magnetic flux density saturation magnitude and therefore provides a circuit output related to the force/pressure being measured by the transducer.

In another presently preferred embodiment, a push-pull driver is used with a sensor having a pair of coils. Alternating ones of the coil-current-flow-controlling devices are toggled at a frequency determined by the sensor ring stack, or core, magnetic flux density saturation level (and therefore the input force/pressure to be sensed) to bring the peak coil input current just into the core saturation region prior to switching.

Accordingly, it is an object of the present invention to provide novel circuitry for operating a magnetoelastic force/pressure transducer, to obtain a periodic waveform output having a frequency related to the force/pressure operating upon the sensor.

This and other objects of the present invention will become apparent upon consideration of the following detailed description, when read in conjunction with the drawings.

BRIEF SUMMARY OF THE DRAWIGS

FIG. 1 is a schematic block diagram of a first presently preferred embodiment of our novel operating circuit for a magnetoelastic force/pressure sensor, illustrating the use of a full-bridge drive circuit;

FIG. 1' is a perspective view of a portion of a rudimentary single-coil magnetoelastic ring stack sensor for measuring the magnitude of a force applied along the stack axis, and useful in understanding operation of the circuit of FIG. 1 therewith;

FIG. 2 is a graph illustrating the relationship between the axial force applied to the transducer and the switching frequency of coil current related thereto, for the circuit of FIG. 1a;

Figure 3:
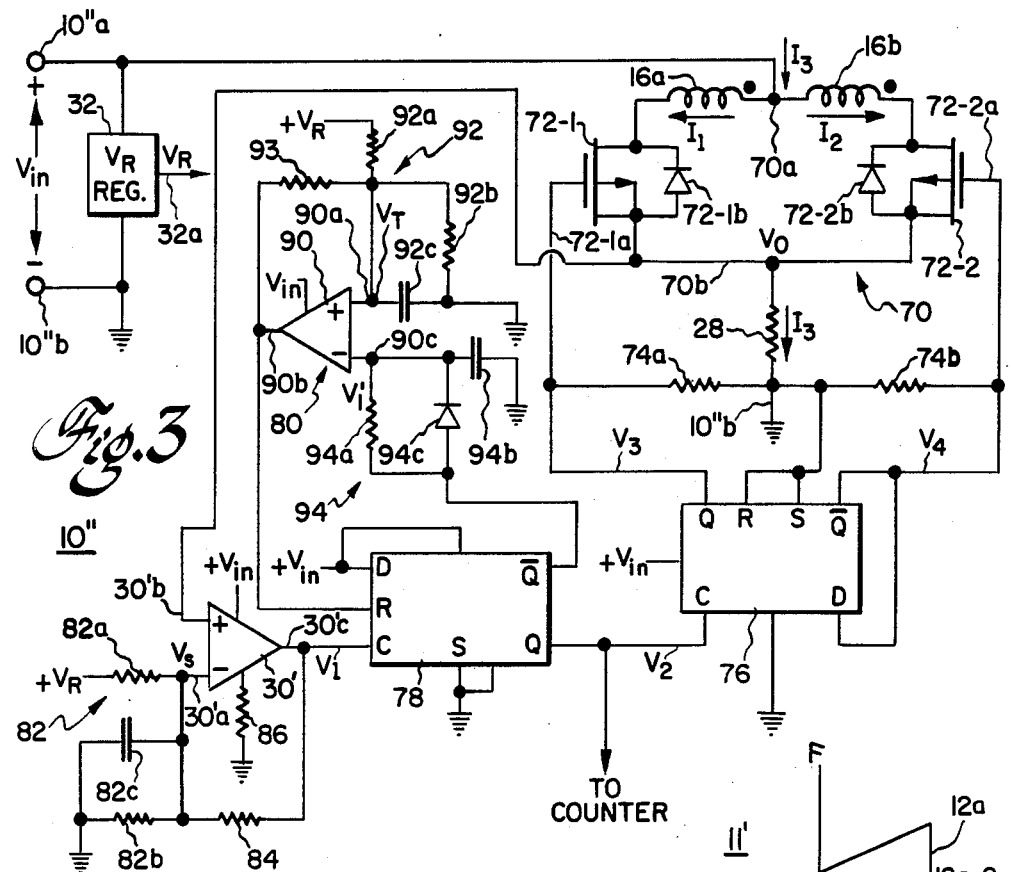
FIG. 3 is a schematic diagram of a presently preferred embodiment of an operating circuit for use with a magnetoelastic force/pressure sensor having a pair of driving coils.
Figure 3:
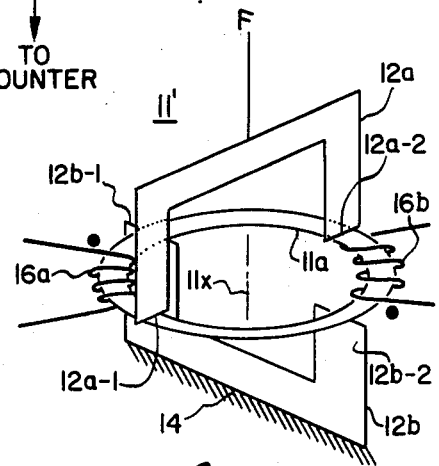

FIG. 3' is a perspective view of a portion of a rudimentary two-coil magnetoelastic force/pressure sensor, and useful in understanding the application of the circuit of FIG. 3 therewith; and FIGS. 3a-3h are a set of coordinated graphs illustrating the signal waveforms occurring in the push-pull sensor operating circuit of FIG. 3.

DETAILED DESCRIPTION OF THE INVENTION

Referring initially to FIGS. 1 and 1', a circuit 10, for operating sensor 11, receives an input voltage $V_{in}$, which is preferably of substantially constant magnitude, with positive polarity at an input terminal 10a, with respect to a negative-polarity/circuit common potential terminal 10b. Sensor 11 is of a type having a magnetic flux density saturation magnitude changing with the magnitude of force F impingent upon the sensor, and is illustratively of the axial-force-detecting type of sensor as more fully described and claimed in the aforementioned co-pending application. Briefly, sensor 11 (FIG. 1') includes a stack 11a of annular rings of a magnetoelastic material, arranged one atop another with a stack axis 11x forming the central axis along which force F is directed. A first member 12a receives the force F and applies the force to a plurality of points, indicated by the edges 12a-1 and 12a-2 at the associated ends of an equal plurality of legs of the member, upon a first major surface of the ring stack 11a. The edges 12b-1 and 12b-2 of legs of another member 12b, itself bearing upon a substantially immovable surface 14, bear upon the opposite major surface of the ring stack 11a. As described in the aforementioned application, the angular spacing between each of the plurality of legs of each member is advantageously (360/N) degrees, and the spacing between alternating legs of alternating members is advantageously (360/2N) degrees, where N is the number of edges per member, e.g. with two legs per member, as illustrated, the edges are spaced at 180° from each other on each member, and the edges of the two different members are at angles of 90° with respect to one another. The application of increasing magnitude to force F tends to increasingly distort the ring stack 11a in a plane substantially orthogonal to the sensor axis 11x and decreases the magnetic flux density saturation magnitude of the stack; the change in saturation magnitude is monitored by operating circuit 10, operating through at least one coil means 16. As also described in the aforementioned co-pending application, it is preferred that each of the upper and lower members 12a and 12b, respectively, have at least three edges (as somewhat schematically shown for sensor 11 in FIG. 1) for increased mechanical stability.

In circuit 10, the single coil means 16 of sensor 11 is connected between the output terminals 20a and 20b of a full-bridge drive means 20. Drive means 20 includes a first switching means 21 connected between a bridge input terminal 20c and first output terminal 20a, a second switching means 22 connected between second output terminal 20b and the bridge common terminal 20d, a third switching means 23 connected between input terminal 20c and second output terminal 20b, and a fourth switching means 24 connected between first output terminal 20a and bridge common terminal 20d. Dependent upon the type of switching means actually utilized, a D.C. blocking capacitance 26 may be required in series connection with coil means 16 between output terminals 20a and 20b, to prevent the flow of a D.C. offset current through coil means 16. Each of switching means 21–24 has an associated control input 21a–24a, controlling the switching means to the open state or closed state responsive to the magnitude of a voltage present thereat. The control inputs 21a and 22a of the first and second switching means are connected in parallel to receive a first switching signal A enabling the simultaneous closure or opening of switching means 21 and 22, while the control inputs 23a and 24a of switching means 23 and 24 are connected in parallel to receive a second switching signal B enabling the simultaneous opening or closure of switching means 23 and 24. Control signals A and B are complementary; control signal A enables closure of switching means 21 and 22 only when control signal B enables switching means 23 and 24 to the open condition, and vice versa.

While current flows in opposite directions through coil means 16 responsive to closure either of both switching means 21 and 22 or of both switching means 23 and 24, the total, or sampling, current flowing through the full-bridge drive means 20 always flows from terminal 20d, through a current-sensing resistance 28, which has an associated voltage $V_0$ formed thereacross. This voltage $V_0$ is provided at the inverting − input 30a of a comparator 30. The non-inverting + comparator input 30b receives a substantially constant reference voltage, of magnitude $V_R$, from the output 32a of a reference voltage means 32, connected across the input voltage $V_{in}$ terminals 10a and 10b. The output 30c of the comparator is connected to a first input 34a of a power switch logic means 34. A second input 34b of power switch logic means 34 receives a synchronizing SYNC signal from the output of a divide-by-N means 36, having its input connected to the output of a periodic-signal waveform-generating clock means 38. Clock means 38 may be a multivibrator, a crystal-controlled clock and the like, and may be part of circuit 10 or external to circuit 10, as from a microprocessor and the like, which might utilize the output of circuit 10 for calculation, display, or other utilization, of the force information provided by the transducer combination of sensor 11 and circuit 10. The circuit 10 output information is provided in digital output form at a first circuit output 10c, itself connected to the output 40b of a counter means 40, having its clock input 40a also connected to the output of clock means 38. The digital data at counter means output 40b and circuit output 10c can be provided in parallel or serial form, as required by the subsequent processing mechanism utilized. To assist an external utilization means in obtaining the correct digital data, the level change at comparator output 30c may be provided at a strobe output 10d, prior to transmission, through a delay means 41, to a reset R input 40c of counter means 40.

An analog output voltage $V_a$ can be provided, if desired, at circuit output terminal 10e, by means of a frequency-to-amplitude converter subcircuit 42. Subcircuit 42 includes a capacitor 42a, coupling one of the bridge switching signals A or B, themselves available at first and second outputs 34c and 34d of the power switch logic means, to appear across a shunt resistance 42b. The voltage across resistance 42b is coupled to a unidirectionally-conducting element 42c, e.g. a semiconductor diode. For a positive-polarity analog voltage $V_a$ output, the anode of diode 42c is coupled to the junction of capacitor 42a and resistor 42b. The cathode of diode 42c is coupled to output terminal 10e, from which terminal a filter capacitance 42d and a filter discharge resistance 42e are coupled in parallel to circuit common (ground) potential.

In operation, assume that one of control signals A and B (e.g. control signal B) has just changed to the level required to close a pair of the juxtapositioned switching devices (e.g. devices 23 and 24) while the remaining control signal (e.g. control signal A) has just changed to the condition required to open the remaining two juxtapositioned devices (e.g. devices 21 and 22). Current flows from circuit input terminal 10a, thence through the conducting, or closed, switching device 23 (and D.C. offset-reducing capacitor 26, if used), thence through coil 16 and the remaining conducting, or closed, switching device 24, and then through sampling resistance 28 to the circuit common terminal 10b. Responsive to the flow of coil current, the core magnetizing force H increases, until the magnetic flux density saturation region is attained. As the core material hysteresis loop has relatively sharp saturation "knees", a relatively large increase in driving coil means 16 current is suddenly required to further increase the magnetic flux density at the saturation magnitude. As the saturation flux density magnitude is reduced for increasing magnitudes of impingent axial force, the time required for the coil current to flow in either direction, prior to the sudden current increase required at magnetic flux density saturation, decreases with increasing axial force magnitude. Sampling resistance 28 converts the coil means current flow to a sampled voltage $V_0$, with a suddenly increasing magnitude at the time, after switching, at which the saturation magnitude is reached. The resistance of sampling resistor 28 and the reference voltage $V_R$ magnitude from reference voltage means 32 are adjusted such that comparator output 30c is at a relatively high voltage level prior to input 30a receiving the voltage peak (corresponding to the core magnetic flux density saturation being reached) and switches to a relatively low voltage level when the sampled voltage $V_0$ magnitude suddenly increases responsive to the magnetic flux density saturation level being reached in the core of sensor 11. Thus, the high-to-low voltage level transition at comparator output 30c occurs after a time interval, commencing after switching of the power switch logic means outputs 34a and 34b, which decreases responsive to an increasing magnitude of axial force F acting upon sensor 11.

The level transition at comparator output 30c accomplishes several tasks: a falling edge strobe signal appears at strobe output 10d, to inform external circuitry that the digital output of counter means 40 should be obtained; counter means reset R input 40c is enabled by the level transition after a delay time $t_d$ (introduced by delay means 41) selected to allow the external circuitry, such as a microcomputer and the like, to be interrupted by the strobe signal and obtain the digital output before that output is reset by the delayed comparator output transition appearing at reset input 40c; and the level transition is coupled to power switch ogic means input 34a to precondition means 34 for a toggling operation which will reverse the levels at control signal outputs 34c and 34d thereof. The actual toggling operation is not carried out until the arrival of a next-subsequent sync. signal at power switch logic means second (or clock) input 34b. The sync. signal is somewhat delayed, by appropriate choice of the divider means 36 division factor N which is determined by the clock means 38 frequency and the delay time $t_d$ of delay means 41, such that the external circuitry has sufficient time after the comparator output 30 falling edge strobe (at output 10d) to acquire the digital output signal at circuit output 10c, before counter means 40 is reset and the levels at power switch logic means outputs 34c and 34d are reversed. Upon control signal output reversal, the entire process is repeated. It should be understood that, as a typical transducer (sensor 11 and circuit 10) provides a toggling frequency which increases with the increasing magnitude of sensed force F, a desired maximum toggling frequency can be established for a maximum sensed force magnitude. If a maximum toggling frequency of about 25 KHz. is assumed, the current flow through coil means 16 is reversed not less than every 200 microseconds. If the external circuitry requires only about 2 microseconds to read the digital output data at circuit output 10c, then the delay time $t_d$ of delay means 41 is about 2 microseconds and the synchronizing signal at power switch logic means input 34b is set to delay toggling of outputs 34c and 34d by the same amount of time, e.g. about 2 microseconds. If clock means 38 provides clock pulses at a relatively higher frequency, about 2 megacycles (if the clock means is the operating clock of a microprocessor and the like), divider means 36 is a divide-by-4 means, to obtain the proper synchronization timing. It will be seen that counter means 40 continues to receive clock pulses for the time delay means delay time $t_d$ interval after a comparator output 30c level change, but before receiving a signal at input 40c resetting the counter means output to a zero count. If the additional counts (e.g. about 4 counts and possibly amounting to about 1 percent of the total counts) must be removed from the total output count to obtain a desired transducer accuracy, either a fixed subtraction can be carried out in an external circuit microprocessor (with the subtracted count amount equal to the product of the number of clock cycles (per microsecond) for clock means 38 times the delay time $t_d$ (in microseconds) of delay means 41), or counter means 40 may be of the presettable type, and may be preset by the required number of counts less than zero, such that the extra counts to be later added due to delay means 41 are removed at the very beginning of each counting cycle. It should also be understood that counter means 40 may be of the type which is reset only for an even number of delayed comparator transitions at input 40c.

The increasing toggling frequency, with increasing axial force F magnitude, increases the number of times per second that diode 42c conducts and adds charge to filter capacitor 42d, increasing the voltage thereon to provide the analog output voltage $V_a$ at circuit output 10e.

Figure 1A:
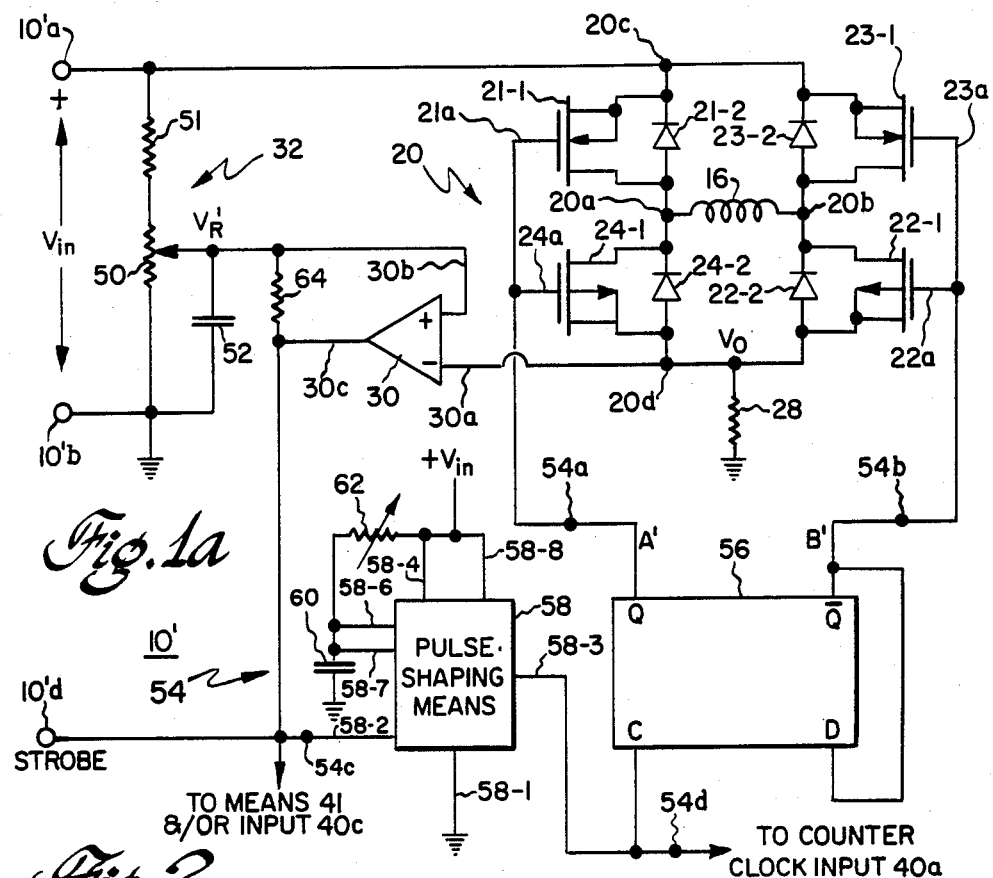
FIG. 1a is a schematic diagram of a presently preferred circuit forming a major portion of the embodiment of FIG. 1.
Figure 2:
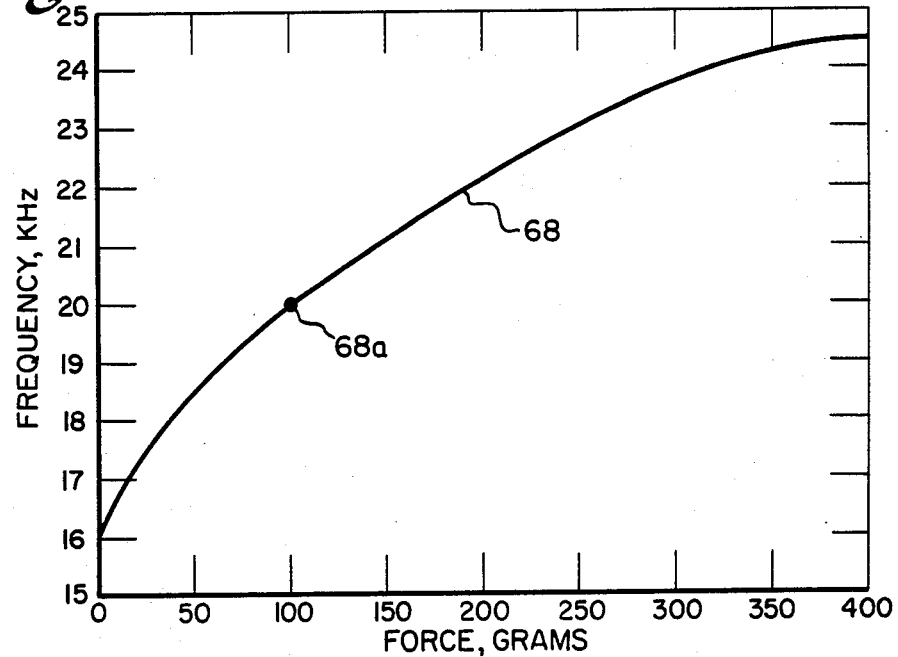

Referring now to FIGS. 1a and 2, one presently preferred full-bridge embodiment 10', for a self-clocking portion of circuit 10, is shown without counter means 40 and delay means 41. This embodiment does not require a clock means 38, although a clock means may be utilized and logically ANDed with the inverse of the signal at an output 54d, for introduction into a counter, if a count inversely related to the toggling frequency is required. The force vs. toggling frequency relationship of circuit 10' is graphed in FIG. 2, for a particular and illustrative sensor 11.

In illustrated embodiment 10', the input voltage $V_{in}$ between positive input terminal 10'a and negative/common input terminal 10'b, is a regulated voltage, e.g. of about 10.0 volts, such as may be easily obtained with common integrated circuit regulators from the power wiring in an automobile and the like. Because a preregulated voltage is available between terminals 10'a and 10'b, adjustable voltage reference means 32 comprises a potentiometer 50 connected in series with a fixed resistance 51 across the input terminals; the potentiometer wiper arm, at which the reference voltage $V'_R$ appears, is noise-filtered to circuit common with a shunt capacitance 52.

The power switch means 20 is a full-bridge comprised of four MOSFET devices 21-1 through 24-1, each having a parasitic, reverse-conduction diode 21-2 to 24-2 present across the controlled-conduction channel thereof. Devices of opposite polarity type are corrected in series to form each side of the bridge, so that the control electrode inputs 21a and 24a of the complementary-polarity-type first and fourth switching devices are now coupled to the control output signal A' common point 54a while the control electrode inputs 22a and 23a of the complementary-polarity-type second and third switching devices 22-1 and 22-3, are connected to the control output signal B' common point 54b. The complementary first and second control output signals A' and B', respectively, are obtained at the complementary outputs 54a and 54b of a power control logic means 54.

Outputs 54a and 54b are respectively connected to the respective Q and $\overline{Q}$ outputs of a D-type flip-flop logic element 56, forming a part of the power control logic means 54. Means 54 is analogous to means 34 of FIG. 1, but does not require a sync. input 34b for proper operation. The data D input of flip-flop 56 is connected to the $\overline{Q}$ output thereof, to achieve toggling operation of flip-flop 56 and alternate the output states of the Q and $\overline{Q}$ outputs responsive to each clock pulse received at a clock C input. The clock C input is also connected, via the power control logic means output 54d, to a toggling frequency counter input (which may be the counter clock input 40a).

The clock pulse is provided at the output terminal 58-3 of a pulse shaping means 58, also forming a portion of power control logic means 54. Flip-flop 56 may be provided by a portion of a standard TTL type 7474 flip-flop integrated circuit, while pulse shaping means 58 may be a standard type 7555 timer integrated circuit. Pulse shaping means 58 receives a positive operating potential, of $+V_{in}$ magnitude, at power supply terminals 58-4 and 58-8 thereof, with reference to a ground potential terminal 58-1 thereof. A threshold terminal 58-6 is connected in parallel with a discharge terminal 58-7, and to the junction between a timing capacitance 60 (having its remaining terminal connected to ground potential), and a variable timing resistance 62 (having its remaining terminal connected to the positive operating potential $V_{in}$). A trigger input 58-2 of the pulse shaping means is connected to the comparator output 30c, which output is also connected to circuit strobe terminal 10'd and, if required, to delay means 41 and/or counter reset means input 40c (see FIG. 1). The comparator 30 inputs are connected as in FIG. 1, i.e. the inverting input 30a being connected to receive the sampling resistance 28 voltage $V_0$ and the non-inverting input 30b being connected to receive the voltage reference means 32 output voltage $V'_R$. A relatively high-value resistance 64 is connected between the comparator non-inverting input 30b and the comparator output 30c, as well known to the art, for input bias compensation.

In operation, comparator 30 functions to provide an output 30c level change when the voltage $V_0$ across the sampling resistance peaks, responsive to the coil means 16 current rapidly increasing due to the core attaining a flux density saturation magnitude. The coil 16 current is a bidirectionally-flowing current. Current flow in a first direction, from bridge terminal 20a to terminal 20b is provided by conduction through the conduction channels of devices 21-1 and 22-1 if control output signal A' is at a low logic level and control signal B' is at a high logic level. It will be seen that at the aforementioned levels, switching devices 23-1 and 24-1 are in the cut-off condition.

Responsive to the falling comparator output level, provided at power control logic means input terminal 54c, pulse shaping means 58 is triggered to produce a positive-going pulse, of pulse width determined by the values of timing capacitance 60 and timer resistance 62, to clock the toggling action of flip-flop 56 and provide a clock pulse to counter input 40a, via power control logic means output 54d. Responsive to the clock pulse at the clock C input, the levels at the Q and $\overline{Q}$ outputs of flip-flop 56 reverse, such that control signal A', at output 54a, rises to a high level, turning off switching device 21-1 and turning switching device 24-1 to the conductive condition. Simultaneously, the control signal B', at output 54b, falls to a low logic level, turning on switching device 23-1 and turning off switching device 22-1, whereby the direction of current flow through coil means 16 is reversed, i.e. flows from terminal 20b toward terminal 20a. The coil current still flows in the same (downward) direction through sampling resistance 28. The sampling resistance voltage $V_0$ is at a relatively low level immediately after the direction of current flow through coil means 16 is reversed, whereby the comparator output 30c voltage again rises to a high logic level, disabling the triggering action upon pulse shaping means 58. At some time thereafter, determined by the axial force upon the transducer, the transducer core is again at its flux density saturation magnitude and the sampling resistance 28 voltage $V_0$ increases to a positive level greater than the positive reference voltage at comparator input 30b, causing the comparator output 30c level to fall and again trigger pulse shaping means 58, to produce a next output pulse. Responsive to this output pulse and the changed logic level at the data D input of the flip-flop, the flip-flop Q and $\overline{Q}$ outputs are again toggled to terminate current flow through coil 16 from switching means terminal 20b to terminal 20a, and reverse the current flow to be from terminal 20a to 20b and again begin the whole cycle.

FIG. 2 illustrates the toggling frequency, (in kiloHertz) vs. force (in grams) relationship for one sensor 11 and operating circuit 10' transducer combination. It will be seen that a minimum toggling frequency of about 16 KHz. occurs for zero force axially incident upon the transducer ring stack, with the toggling frequency increasing to a value of about 24.5 KHz. for a maximum 400 gram axial force on the sensor. The force-frequency curve 68 is monotonic, although non-linear, and is substantially reproducable on a transducer-by-transducer basis. For applications wherein action is to be taken only when a certain force is exceeded (e.g. only if a force, or corresponding pressure, of, for example, greater than 100 grams), the external circuitry is only required to act if the toggling frequency exceeds the particular frequency, e.g. approximately 20 KHz., associated with the threshold force/pressure. Even if different actions are required at a plurality of substantially-fixed levels, the external circuit (not shown) will monitor and act only if the toggling frequency for the particular one of the plurality of levels is attained, or exceeded. For other applications where a continuous force/pressure reading is required, the external means may include a microprocessor having a look-up data table stored therein for conversion of frequency to equivalent force, in manner well known to the art.

Figure 1B:
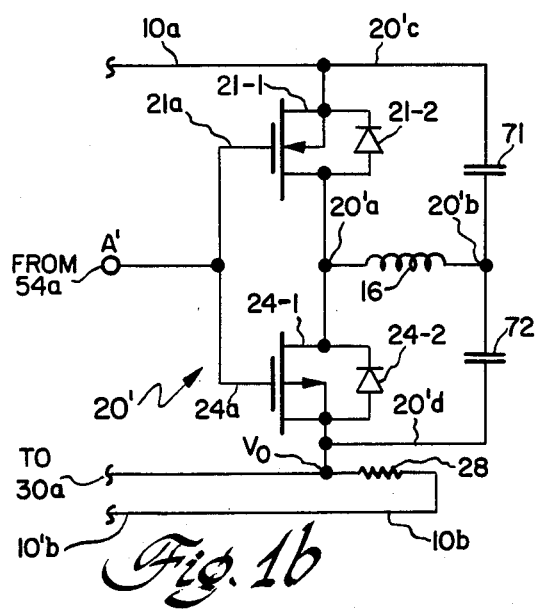
FIG. 1b is a portion of a schematic diagram replacing a portion of the circuit of FIG. 1a, and illustrating the use of a half-bridge single-coil driving circuit for use in the operating circuit of FIG. 1.

Substantially the same results as illustrated in FIG. 2 can be obtained with the use of a half-bridge circuit 20' in circuit 10'. Half-bridge 20' is illustrated in FIG. 1b, and substitutes first and second capacitances 71 and 72, respectively, for the controlled devices 23-1 and 22-1 utilized in one side (e.g. the right hand side) of the full-bridge 20 of FIG. 1a. The half-bridge approach of FIG. 1b can be economical if the peak current required to flow through coil means 16 is relatively large, whereby the pair of capacitors 71 and 72 may be more cost-effective, at the relatively high toggling frequencies utilized in the magnetoelastic force sensor operating circuit, with respect to the cost of a pair of active devices 22-1 and 23-1, which may then not be capable of being integrated with the remainder of the circuitry into a single integrated circuit. Under such conditions, the two remaining controlled devices 21-1 and 24-1 will themselves probably be discrete devices also incapable of integration into a single integrated circuit with the comparator, pulse shaping means, flip-flop counter and the like. However, for the sensor having the response characteristics illustrated in FIG. 2, a peak current of only about 90 milliamperes was required, whereby four relatively low-power switching devices can be easily integrated into the same integrated circuit I0 chip as the remainder of the circuit, and the relatively large-value capacitors 71 and 72 cannot be so integrated; a full-bridge implementation, as illustrated in FIG. 1 is then more cost-effective.

Referring now to FIGS. 3, 3' and 3a–h, a self-clocking operating circuit 10' is illustrated for use with a magnetoelastic axial force/pressure sensor 11', having a pair of coil means 16a and 16b (FIG. 3'). In all other respects, sensor 11' is substantially the same as sensor 11 of FIG. 1'. Circuit 10" operates by driving the sensor annular ring stack 11a to a constant magnetizing force H on the hysteresis loop and determining the magnetic flux density B magnitude at that point by observation of the frequency, or period, of oscillation. The coil means 16a and 16b are driven in so-called "push-pull" manner, whereby current flows in only one of two coil means at any instant of time, and, when current flows through different ones of the alternatingly-energized coil means, causes (as with the bidirectional current flow in a single-coil sensor) the magnetic flux induced thereby to reverse direction in the sensor core.

Circuit 10" receives the positive input voltage $V_{in}$ at first input terminal 10"a, with respect to common potential input terminal 10"b and provides the input voltage to the voltage regulating means 32 (producing the regulated voltage $V_R$ at its output 32a thereof. A push-pull switching means 70 utilizes a pair of like-polarity-type power switching devices 72-1 and 72-2, each having its controlled-conduction channel in series with one of coil means 16a and 16b. The pair of coil/switching device branches are connected in parallel between a switching means input terminal 70a (itself receiving the positive circuit input voltage) and a switching means output terminal 70b, connected to common potential point 10"b through sampling resistance 28. Each of switching devices 72-1 or 72-2 has a control input 72-1a or 72-2a, at which a positive voltage, with respect to means output 70b, will control the associated device conduction channel into current conduction; inputs 72-1a and 72-2a are driven in complementary fashion by voltages V3 and V4, respectively, appearing across input resistances 74a and 74b, so that first coil means 16a current $I_1$ and second coil means 16b current $I_2$ flow in alternating fashion. The total current $I_1$ plus $I_2$ equals the total switching means current $I_3$ flowing into switching means terminal 70a and out of switching means terminal 70b and through sampling resistance 28 to provide the sampling voltage $V_0$ thereacross. Each of switching devices 72-1 or 72-2 has a parasitic reverse-conduction diode 72-1b or 72-2b in parallel with its controlled-conduction channel.

The complementary switching device driving voltages V3 and V4 are respectively provided at the respective Q and $\overline{Q}$ outputs of a first D-type flip-flop logic element 76. The set S and reset R inputs of the first flip-flop element are permanently connected to ground potential point 10"b, while the data D input thereof is permanently connected to the $\overline{Q}$ output, such that the logic levels at the Q and $\overline{Q}$ outputs toggle, in alternating manner, responsive to each occurrence of a clock pulse voltage $V_2$ waveform at a clock C input of flip-flop 76. The clock voltage $V_2$ pulses are provided at the Q output of a second D-type flip-flop logic element 78. The data D input of second flip-flop 78 is connected, as are the operating potential terminals of both flip-flops, to receive the $+V_{in}$ input voltage. The set S input of second flip-flop 78 is permanently connected to ground potential, but the reset R input is connected to the output of a one-shot multivibrator means 80, receiving its input from the $\overline{Q}$ output of second flip-flop 78. The clock C input of second flip-flop 78 receives a clock voltage V1 pulse waveform from the output 30'c of the peak current detector comparator 30'. As in the previous embodiments, the non-inverting input 30'b of the comparator receives the sampled $V_0$ voltage across sampling resistance 28; the comparator inverting input 30'a receives a substantially constant threshold voltage $V_S$ available at the output junction of a voltage divider means 82 having the regulated reference voltage $V_R$ connected thereacross. Voltage divider means 82 includes first and second resistances 82a and 82b, and a noise-filtering capacitance 82c connected from input 30'a to circuit common potential. A relatively high resistance feedback element 84 is connected between comparator input 30'a and comparator output 30'c, for input bias compensation, while an additional resistance element 86 is connected from the operational amplifier to ground potential to set the amplifier current characteristics.

The one-shot, or monostable, multivibrator means 80 utilizes a second comparator means 90 having a non-inverting + input 90a held at a substantially constant potential $V_T$ at the output junction of another voltage dividing means 92, connected across the reference voltage $V_R$. Second voltage divider means 92 includes first and second series connected resistances 92a and 92b and a noise-filtering capacitance 92c connected between input 90a and circuit common potential. An input bias compensation feedback resistance element 93 is connected between input 90a and comparator output 90b. A delay means 94 is connected between the second comparator inverting − input 90c and the $\overline{Q}$ output of second flip-flop 78. Delay means 94 includes a delay resistance in series between the $\overline{Q}$ output of flip-flop 78 and the inverting input 90c, a shunt capacitance 94b from input 90c to ground potential, and a unidirectionally-conducting element (a diode) 94c connected in parallel with resistance 94a and poled to conduct for a high logic level at the second flip-flop $\overline{Q}$ output. Monostable multivibrator means 80 functions to reset second flip-flop 78 after a change of output state thereof, responsive to a comparator output $V_1$ level change, preparatory to receiving a next comparator output voltage V1 level change, so as to provide a single pulse of clock $V_2$ voltage to the first comparator clock input for each comparator output $V_1$ positive-going transition.

Figure 3A:
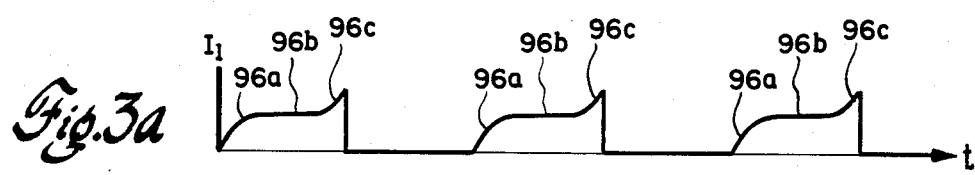
Figure 3B:
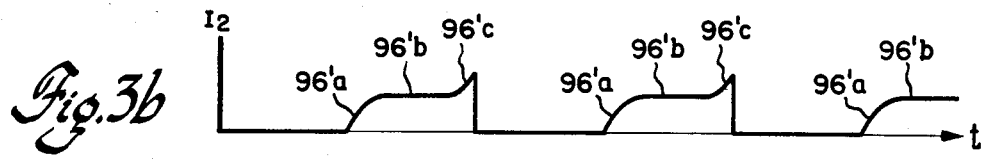
Figure 3C:
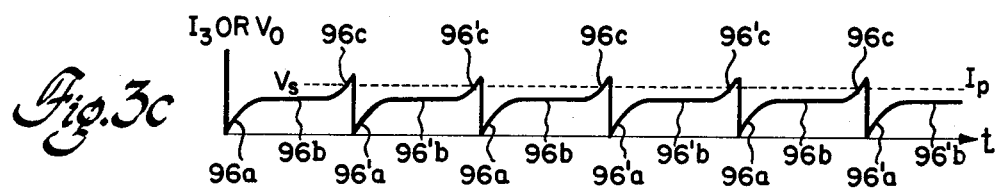
Figure 3D:
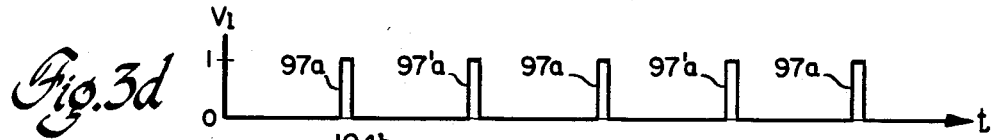
Figure 3E:
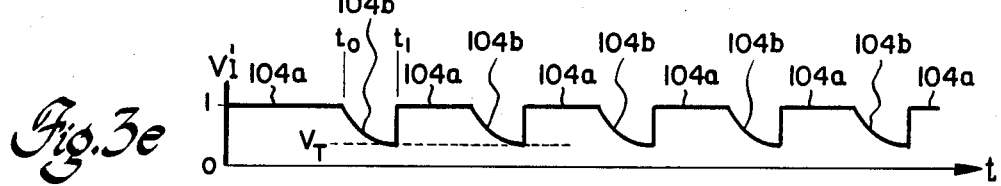
Figure 3F:
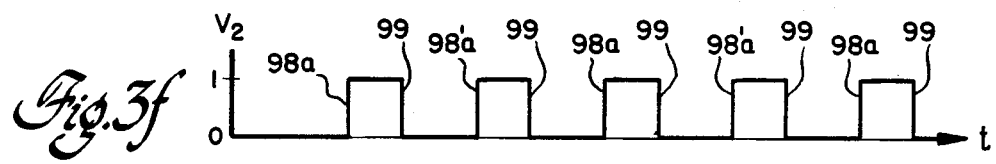
Figure 3G:
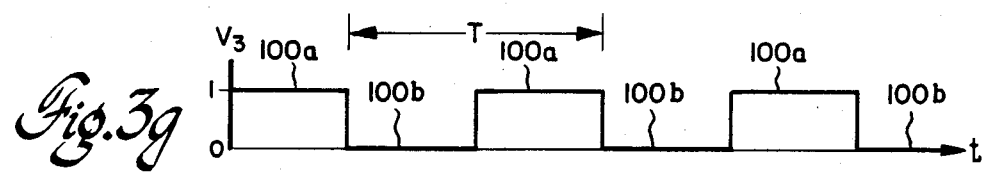
Figure 3H:
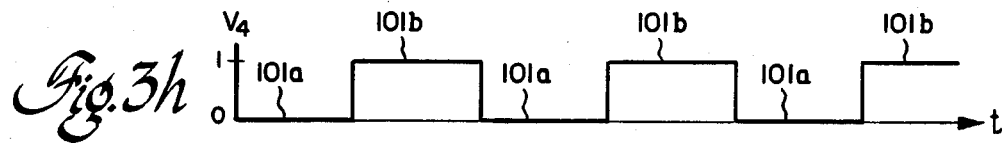

In operation, and specifically referring to FIGS. 3 and 3a–3h, either output of first flip-flop 76 may be at a high logic level when the circuit is initially energized. Assume that the Q output voltage $V_3$ is initially at the high logic level, such that switching device 72-1 is saturated and current $I_1$ begins to flow through first coil means 16a (FIG. 3a). First coil current $I_1$ increases, in a first portion 96a, until the core magnetizing force H is at a substantially constant level, when the coil current levels off, as shown in a second portion 96b. At some time thereafter, at the constant value of magnetizing force, the region where the core magnetic flux density B enters saturation is attained and the coil current suddenly increases, as shown at portion 96c. As the other switching device 72-2 is in the cut-off condition and second coil means 16b current $I_2$ is not flowing, the total current $I_3$ (flowing through sampling resistance 28 and forming the sampling voltage $V_0$ thereacross) has the same waveform shape (FIG. 3c) as the first coil means 16a current $I_1$. The voltage $V_S$, at comparator input 30'a, is set to be larger than the sample voltage $V_0$ magnitude during portions 96a and 96b of the coil current waveform and the comparator output voltage $V_1$ is accordingly at a low (logic 0) level (FIG. 3d). When saturation peak current portion 96c is reached, the corresponding peak current $I_P$ increases the sample voltage $V_0$ at input 30'b to exceed the voltage $V_S$ set at input 30'a and the comparator output voltage $V_1$ changes to a high (logic 1) level responsive thereto, as shown by rising edge 97a (FIG. 3d). Rising edge 97a clocks the logic 1 value at the D input of second flip-flop 78 to the Q output thereof, toggling first flip-flop 76 to switch the Q output voltage $V_3$ (FIG. 3g) thereof from the previous logic 1 level to a low, logic 0 level and causing the $\overline{Q}$ output voltage $V_4$ to change from the previous low logic level to a high logic level 101b (FIG. 3h). First switching device 72-1 is now turned off and first coil means current $I_1$ is terminated, while switching means 72-2 is turned on and second coil means 16b current $I_2$ begins to increase. The second coil means current $I_2$ (FIG. 3b) has the same general shape as the first coil means current $I_1$, having an initial portion 96'a, a substantially constant central portion 96'b and a peak portion 96'c when the core flux density saturation magnitude region is reached. Thus, it will be seen that the total current $I_3$, and therefore the voltage $V_0$ across the sampling resistance 28, is a waveform which repeats during the interval when second coil means current $I_2$ flows, and furnishes an additional rising edge 97a' in the comparator output voltage $V_1$ waveform, between each of the rising edges 97a thereof contributable to the peak current portions of the first coil means current $I_1$. In order for each of the interspersed additional rising edges 97'a to again set the Q output of the second flip-flop 78 to a logic 1 level, creating additional rising edges 98'a thereat and retoggling first flip-flop 76, the second flip-flop 78 has to be reset prior to the occurrence of each additional comparator output voltage waveform leading edge 97'a. The resetting process, described hereinbelow, causes the second flip-flop Q output to revert to the logic 0 state, with falling edges 99, so that first flip-flop 76 can again be toggled, to again set the first Q output voltage $V_3$ back to the logic 1 level 100a and reset the second $\overline{Q}$ output voltage $V_4$ to the logic 0 level, or vice versa, dependent upon the state of those output voltages immediately prior to the appropriate rising edge 98a or 98'a of first flip-flop clock input voltage $V_2$.

The required resetting of second flip-flop 78 is accomplished by monostable multivibrator means 80. It will be seen that, as the Q output of second flip-flop 78 is normally at the logic 0 level, the complementary $\overline{Q}$ output thereof must normally be at a logic 1 level, forward-biasing diode 94c, such that the voltage $V_1'$ at comparator input 90c is normally at the logic 1 level, as shown by level 104a in FIG. 3e. At the time $t_0$ when the rising second flip-flop clock input voltage $V_1$ provides a rising edge 97a or 97'a, and the second flip-flop Q output voltage $V_2$ appropriately rises to the logic 1 level, the second flip-flop $\overline{Q}$ output falls to the logic 0 level. As capacitor 94b was previously charged to a logic 1 level voltage, diode 94c is suddenly reverse-biased and the charge stored in capacitance 94b flows back through delay resistance 94a to the now-low-level $\overline{Q}$ output of flip-flop 78. The voltage $V_1'$ at input 90c exponentially decays, as in portions 104b of FIG. 3e, until that voltage decreases to below the magnitude $V_T$ of the substantially constant voltage at the other comparator input 90a. Responsive thereto, the comparator output 90b switches from a normally low logic level to a logic 1 level, at time $t_1$. Thus, at time $t_1$, a logic 1 resetting level appears at the second flip-flop reset R input and resets the second flip-flop Q output voltage $V_2$ to the logic 0 level, as shown by falling edges 99 in FIG. 3f, and also resets the complementary $\overline{Q}$ output back to the logic 1 level. Responsive to the logic 1 level now present at the anode of diode 94c, that diode becomes forward-biased and substantially immediately recharges capacitance 94b to bring the comparator input 90c voltage $V_1'$ back to the logic 1 level. As the logic 1 level at input 90c is now greater than the voltage $V_T$ magnitude at input 90a, the comparator output 90b reverts to the logic 0 output state, removing the resetting level from the second flip-flop reset R input. The values of timing resistance 94a and capacitance 94b are chosen such that the reset time interval between time $t_0$ and time $t_1$ is less than the minimum time between toggling operations, and is thus less than half of the minimum toggle time interval T, corresponding to the maximum oscillatory frequency of the transducer, itself responsive to the receipt of the maximum magnitude of axial force on sensor 11'.

Thus, circuit 10' has a number Of signals available with waveforms oscillating at a toggle frequency responsive to the magnitude of axial force acting upon the transducer sensor and the appropriate one of these waveforms can be taken as the circuit output, dependent upon the requirements of the means receiving the transducer toggle frequency output. For example, the first flip-flop clock voltage $V_2$ pulse can be provided, as illustrated, to a counter, as can the relatively more narrow comparator output voltage $V_1$ pulses, if the toggling-frequency-counting circuit does not require a symmetrical waveform. If the toggling frequency counter does require a symmetrical waveform, one of the switching device voltage $V_3$ or $V_4$ waveforms can be utilized to drive the counter input. Similarly, the associated counter (not shown in this Figure) can have the counter contents read, and the counter reset, responsive solely to the requirements of other additional circuitry, such as a microcomputer means and the like, and the additional external toggle frequency-to-force-/pressure conversion can be carried out in a manner which is time-independent of the operation of the transducer operating circuit 10'.

While several presently preferred embodiments of our novel operating circuit for magnetoelastic force-/pressure sensor are described in detail herein, many modification and variations will now become apparent to those skilled in the art. It is our intent to be limited only by the scope of the appending claims, and not by the specific details and instrumentalities presented by way of explanation of the presently preferred embodiments herein.

What is claimed is:

1. An operating circuit for providing an output having a characteristic changing responsive to the magnitude of a force incident upon a magnetoelastic sensor having at least one coil means wound about a magnetoelastic core with a magnetic flux density saturation magnitude changing responsive to the magnitude of said force, comprising:

first means operating upon said at least one coil means for varying the magnetizing force in said core to cause the core flux density to attain substantially the saturation magnitude thereof in either selected one of a pair of opposite polarity saturation regions;

second means for providing a signal upon detection of a change in the current flowing through said at least one coil means responsive to said core flux density entering one of said saturation regions; said operating circuit output characteristic being the frequency at which the second means signal occurs;

third means, responsive to each occurrence of said second means signal, for causing said first means to reverse the direction of the magnetizing force in said core to vary said core flux density to the saturation region of the other polarity; and fourth means for varying said operating circuit output characteristic responsive to the number of core magnetizing force reversals in a selected time interval and therefore responsive to said incident force magnitude, and comprising: clock means for generating a periodic signal waveform; counter means for counting the number of clock means waveforms occurring between a pair of selected consecutive second means signals; and means for resetting said counting means after the occurrence of a selected number of second means signals, to facilitate providing a next count related to the incident force upon said sensor in the interval between the resettings of said counting means.

2. The operating circuit of claim 1, wherein said second, third and fourth means are integrated into a single integrated circuit device.

3. The operating circuit of claim 2, wherein said first means is also integrated into said single integrated circuit device.

4. An operating circuit for providing an output having a characteristic changing responsive to the magnitude of a force incident upon a magnetoelastic sensor having a single coil, having first and second ends, wound about a magnetoelastic core with a magnetic flux density saturation magnitude changing responsive to the magnitude of said force, comprising:

first means operating upon said at least one coil means for varying the magnetizing force in said core to cause the core flux density to attain substantially the saturation magnitude thereof in either selected one of a pair of opposite polarity saturation regions;

second means for providing a signal upon detection of a change in the current flowing through said at least one coil means responsive to said core flux density entering one of said saturation regions; said operating circuit output characteristic being the frequency at which the second means signal occurs;

third means, responsive to each occurrence of said second means signal, for causing said first means to reverse the direction of the magnetizing force in said core to vary said core flux density to the saturation region of the other polarity; said third means comprising: a flip-flop logic element having first and second complementary outputs and an input receiving each occurrence of said second means signal for toggling said complementary outputs to that one of a pair of states opposite to the state the associated output was in prior to receiving the second means signal occurrence; said first means utilizing the state of said complementary output signals for determining that one of said pair of saturation regions toward which said core flux density is varied; and fourth means for varying said operating circuit output characteristic responsive to the number of core magnetizing force reversals in a selected time interval and therefore responsive to said incident force magnitude.

5. The operating circuit of claim 4, wherein said first means comprises: a source of operating potential; and full-bridge switching means for causing a current from said source to flow through said single coil in that one of a pair of opposite directions responsive to the set of flip-flop output states then present.

6. The operating circuit of claim 5, wherein said full-bridge switching means comprises: a bridge source input terminal connected to said source; a bridge common terminal; and four switching devices each having a controlled-conduction circuit and an input for controlling current flow through said controlled-conduction circuit; first and second pairs of said switching devices respectively having the controlled-conduction channels thereof connected together in respective first and second series-connected branch circuits; the first and second series-connected controlled-conduction channel branch circuits being connected in parallel with one another between said bridge source input and common terminals, with the junction between each pair of series-connected controlled-conduction channels in each branch circuit being connected to an associated one of said single coil first and second ends; and a different pair of said switching device inputs being connected to each of said flip-flop complementary outputs.

7. The operating circuit of claim 6, wherein all of said switching devices are of identical polarity-type; the input of a device closest to said bridge source input terminal in one series-connected branch circuit and the input of a device closest to said bridge common terminal in the remaining series-connected branch circuit being coupled in parallel to the associated one of said flip-flop outputs.

8. The operating circuit of claim 7, wherein all of said switching devices are MOSFETs.

9. The operating circuit of claim 6, wherein the switching device closest to said bridge source input terminal in each of said first and second series-connected branch circuits is of a first polarity-type, and the switching devices closest to said bridge common terminal in each of said first and second series-connected branch circuits are of a complementary polarity-type; the inputs of both switching devices in each respective one of said first and second branch circuits being connected in parallel and then to a same one of said first and second flip-flop outputs.

10. The operating circuit of claim 9, wherein all of said switching devices are MOSFETs.

11. The operating circuit of claim 6, further comprising: means, in series with said single coil, for substantially preventing flow of a D.C. offset current therethrough.

12. The operating circuit of claim 11, wherein said preventing means is a capacitive element.

13. The operating circuit of claim 4, wherein said first means comprises: a source of operating potential; and half-bridge switching means for causing a current from said source to flow through said single coil in that one of a pair of opposite directions responsive to the state of at least one of said flip-flop outputs.

14. The operating circuit of claim 13, wherein said half-bridge switching means comprises: a bridge input terminal connected to said source; a bridge common terminal; a pair of switching devices each having a controlled-conduction circuit and an input for controlling current flow through said controlled-conduction circuit; the controlled-conduction circuits of said pair of devices being connected in series between said bridge input and common terminals; and a pair of reactive elements in series connection between said bridge input and common terminals; the junction between the controlled-conduction circuits of said first and second switching devices and the junction between said pair of reactive elements being respectively connected to a respective one of said single coil first and second ends.

15. The operating circuit of claim 14, wherein said reactive elements are each capacitive elements.

16. The operating circuit of claim 15, wherein both capacitive elements have substantially the same value of capacitance.

17. The operating circuit of claim 14, wherein said switching devices are MOSFETs.

18. The operating circuit of claim 17, wherein said MOSFETS are of complementary polarity-type, each having the input thereof connected in parallel to a single selected flip-flop output.

19. An operating circuit for providing an output having a characteristic changing responsive to the magnitude of a force incident upon a magnetoelastic sensor having at least one coil means wound about a magnetoelastic core with a magnetic flux density saturation magnitude changing responsive to the magnitude of said force, comprising:

first means operating upon said at least one coil means for varying the magnetizing force in said core to cause the core flux density to attain substantially the saturation magnitude thereof in either selected one of a pair of opposite polarity saturation regions;

second means for providing a signal upon detection of a change in the current flowing through said at least one coil means responsive to said core flux density entering one of said saturation regions, and comprising: means for sampling the current flowing through all of said at least one coil means to provide a sampling signal; means for providing a reference signal of a preselected substantially-constant magnitude; and comparator means for providing said second means signal whenever the magnitude of said sampling signal exceeds the magnitude of said reference signal;

third means, responsive to each occurrence of said second means signal, for causing said first means to reverse the direction of the magnetizing force in said core to vary said core flux density to the saturation region of the other polarity; and fourth means for varying said operating circuit output characteristic responsive to the number of core magnetizing force reversals in a selected time interval and therefore responsive to said incident force magnitude.

20. The operating circuit of claim 19, wherein said at least one sensor coil means comprises a single coil having first and second ends.

21. The operating circuit of claim 19, wherein said at least one sensor coil means comprises first and second coils, each having a first end connected in common and oppositely-phased second ends.

22. The operating circuit of claim 21, wherein said first means comprises: a source of operating potential connected to said common coil first ends; a first means common terminal; and means connected between said coil second ends and said common terminal for causing current, responsive to the state of at least one input signal, from said source to flow through only one of said coils in a direction causing the magnetic force in said core to be directed in a direction opposite to the direction in which the magnetizing force would be directed if current flows through the other coil.

23. The operating circuit of claim 22, wherein said current-causing means comprises first and second switching means, each in series between an associated one said first and second coil second ends and said common terminal, for enabling and disabling current flow through the associated coil responsive to different input signal states.

24. The operating circuit of claim 19, wherein said sampling means comprises a resistance receiving the current flowing from a common terminal of said first means.

25. The operating circuit of claim 19, wherein said reference signal providing means comprises: means for receiving an operating circuit potential; means for providing a regulated voltage at a magnitude less than the magnitude of the operating circuit potential; and voltage divider means for adjusting the regulated voltage to the preselected reference signal magnitude.

26. The operating circuit of claim 19, further comprising means for disabling said second means signal after each occurrence thereof and during a predetermined time interval before the magnitude of said sampling signal will again exceed the magnitude of said reference signal.

27. The operating circuit of claim 26, wherein said disabling means comprises: a flip-flop logic element having a clock input receiving said second means signal from said comparator means, an output substantially immediately providing said second means signal to said third means upon receipt of said second means signal from said comparator means at said clock input, and a reset input for disabling said second means signal at said flip-flop output responsive to a reset signal; and resetting means triggered by the appearance of said second means signal at said flip-flop output for providing said reset signal at said predetermined time interval after said second means signal appearance.

28. The operating circuit of claim 27, wherein said resetting means comprises: means for providing a threshold signal of a preselected substantially-constant magnitude; a comparator having a first input receiving said threshold signal, a second input, and an output at which said reset signal appears only when the magnitude of a signal at said second input changes to a value less than the magnitude of the threshold signal at said first input; and network means connected between said flip-flop logic element and said comparator second input for providing a comparator second input level decreasing to less than said threshold level within said predetermined time interval after each second means signal appears and for increasing said comparator second input signal to a level greater than said threshold level substantially upon disablement of said second means signal at said comparator output.

29. The operating circuit of claim 28, wherein said flip-flop logic element also provides a complementary output; and said network means comprises: a unidirectionally-conducting device poled to conduct whenever said complementary output is at a level corresponding to said second means signal being absent from said flip-flop output; a capacitive element connected to said comparator second input for receiving charge through said unidirectionally-conducting element to increase the signal level at said comparator second input; and a timing resistance connected between said complementary output and said comparator second input for establishing the time constant at which the capacitive element discharges when said complementary output is at another level responsive to said second means signal being present at said comparator output.

30. An operating circuit for providing an output having a characteristic changing responsive to the magnitude of a force incident upon a magnetoelastic sensor having first and second coils, each having a first end connected in common and oppositely-phased second ends, wound about a magnetoelastic core with a magnetic flux density saturation magnitude changing responsive to the magnitude of said force, comprising:
first means operating upon said at least one coil means for varying the magnetizing force in said core to cause the core flux density to attain substantially the saturation magnitude thereof in either selected one of a pair of opposite polarity saturation regions; said first means comprising: a source of operating potential connected to said common coil first ends; a first means common terminal; and means including first and second switching means, each connected in series between an associated one of said first and second coil second ends and said common terminal for enabling and disabling current flow through the associated coil, responsive to different states of at least one input signal, from said source to flow through only one of said coils in a direction causing the magnetic force in said core to be directed in a direction opposite to the direction in which the magnetizing force would be directed if the current flows through the other coil;
second means for providing a signal upon detection of a change in the current flowing through said at least one coil means responsive to said core flux density entering one of said saturation regions;
third means, responsive to each occurrence of said second means signal, for causing said first means to reverse the direction of the magnetizing force in said core to vary said core flux density to the saturation region of the other polarity, and comprising: a flip-flop logic element having first and second complementary outputs and an input receiving each occurrence of said second means signal for toggling said complementary outputs to that one of a pair of states opposite to the state the associated output was in prior to receiving the second means signal occurrence; each of said switching means utilizing the state of a different one of said complementary output signals for determining the enablement and disablement of current flow through the associated one of said coils; and
fourth means for varying said operating circuit output characteristic responsive to the number of core magnetizing force reversals in a selected time interval and therefore responsive to said incident force magnitude.

31. The operating circuit of claim 30, wherein each of said switching means is a switching device having a controlled-conduction circuit series connected between the associated coil second end and said common terminal, and an input coupled to a different one of said flip-flop outputs from the output to which the other switching device input is connected, for controlling current flow through said controlled-conduction circuit.

32. The operating circuit of claim 31, wherein each of said switching devices is a MOSFET.

33. The operating circuit of claim 31, wherein each of said switching devices is of the same polarity-type.

* * * * *